May 21, 1929. J. T. BERTHELOTE 1,713,815
SWAB HOLDER AND SWAB THEREFOR
Filed Feb. 20, 1928
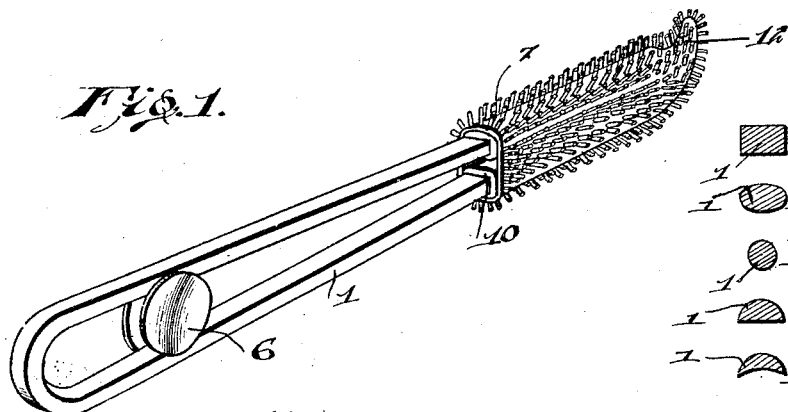
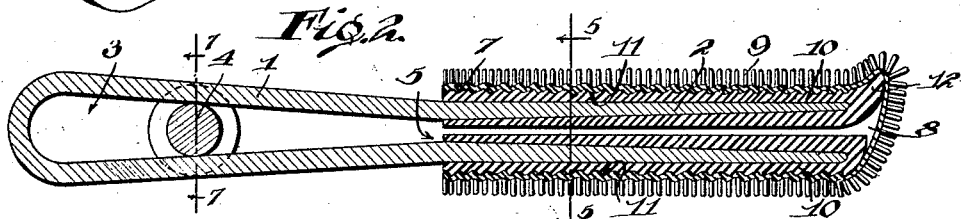
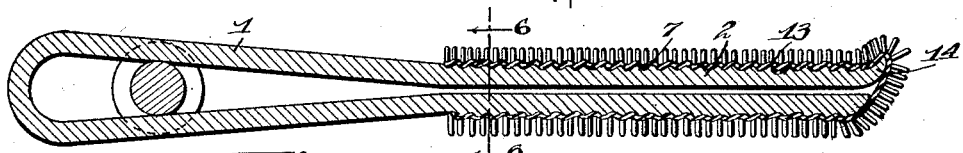
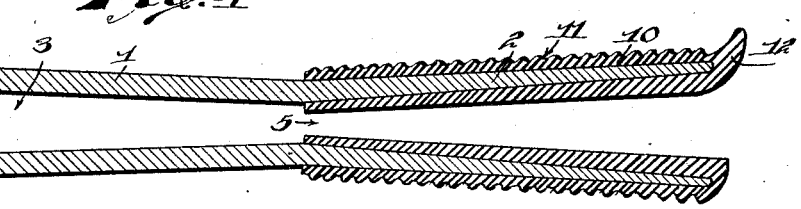
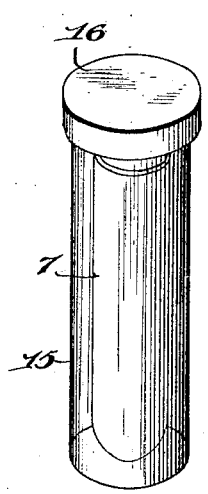
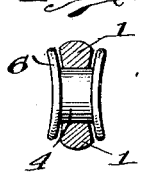
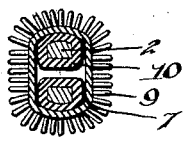
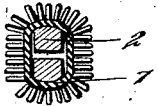
INVENTOR
J. T. Berthelote
BY
ATTORNEY Patented May 21, 1929.

1,713,815

UNITED STATES PATENT OFFICE.

JOSEPH T. BERTHELOTE, OF CARLSBAD, CALIFORNIA.

SWAB HOLDER AND SWAB THEREFOR.

Application filed February 20, 1923. Serial No. 255,779.

This invention relates to improvements in swab holders and swabs therefor, and it consists of the constructions, combinations and arrangements herein described and claimed.

An object of the invention is to provide an implement intended to be used for a variety of cleansing purposes, this implement being primarily composed of a handle and a cleansing element which will be held in position partly by a quality of said element as well as a certain resilient quality of the handle.

Another object of the invention is to provide an implement which is well adapted to certain mouth cleansing purposes, but the principle of which is adaptable to cleansing purposes of other natures.

Other objects and advantages appear in the following specification reference being had to the accompanying drawing in which, Figure 1 is a perspective view of the implement as it appears in the preferred embodiment of a mouth cleanser, Figure 2 is a longitudinal section of the structure in Figure 1, Figure 3 is a longitudinal section of the handle alone, Figure 4 is a longitudinal section illustrating both a modified form of handle and applied cleansing element, Figure 5 is a cross section taken on the line 5—5 of Figure 2, Figure 6 is a cross section taken on the line 6—6 of Figure 4, Figure 7 is a cross section taken on the line 7—7 of Figure 2, Figure 8 is a detail cross section illustrating a modification of the cleansing element, Figures 9 to 13 inclusive are detail sectional views illustrating various forms of handle shanks, Figure 14 is a detail perspective view of a sanitary container for the cleansing element.

Mention has been made in one of the foregoing brief statements of the objects of the invention that the implement is intended to be used for a variety of cleansing purposes. The primary cleansing purpose in mind is the adaptation and use of the implement as a tooth brush. For that particular use the cleansing element is made so that a thorough cleansing action can be performed upon the teeth without injuring the sensitive gums. Provision is also made so that any semblance of an unsanitary condition can be avoided by use of the implement.

The other uses to which the implement may be put are that of a handle or holder for medical swabs substantially the same in form as the cleansing element herein disclosed, dusters, dish washers, car washers, etc. Such appliances will evidently be of basic tubular form so that an end of the handle may be inserted there into for the holding of the appliance by virtue of certain inherent resiliency of the handle.

Reference is now made to the drawing in order that an understanding of the structure may be had. The handle 1 is of an exaggerated U shape. The extensions 2 thereof are so designated for the purpose of distinction. The space 3 between the shanks of the handle comprises a passageway for a spreader 4, the passage available to the spreader terminating at the point 5 of constriction.

As shown in Figure 7 the spreader 4 has the shape of a spool. The body of the spreader occupies the passageway 3 while the heads or ends 6 lie beside the handle shanks along which the spreader is slidable by simply pushing it in the appropriate direction. When pushed toward the constriction 5 the handle shanks will be spread in order to separate the extensions 2 and thus serve to adequately hold the cleansing element.

The cleansing element 7 is of tubular shape in the present instance, closed at one end as at 8. Conceivable and permissible modifications suggest an element open at both ends. The structure thereof may be composed of a woven, knit or other textile, or it may be made of some other suitable material.

Extending from the cleansing element and comprising part thereof are the protrusions 9 which resemble the bristles of a tooth brush. These protrusions must have sufficient inherent strength to accomplish the scouring or other action demanded of them. Ordinarily the material of the cleansing element will be of a yielding nature so that the expansion of the handle after insertion thereinto may serve to hold the element taut by virtue of spreading the element.

In Figures 2, 3 and 5 extensions 2 are covered with caps 10 of a material softer than that of the handle. An appropriate grade of rubber will probably be selected material. Opposite sides of the caps have interrupted surfaces as at 11 in order to establish a more effective frictional hold upon the cleansing element. One of the caps has a protruding horn 12 which has the effect of raising the adjacent part of the cleansing element as shown.

The horn offers the advantage of enabling the user to operate the element in otherwise inaccessible corners. While the horn has several advantages yet it may be omitted if desired.

Figure 4 illustrates the foregoing principle in a slightly different manner. Here the roughened caps are omitted. Opposite surfaces of the extensions 2 are roughened or interrupted at 13 for the same purpose of facilitating the holding qualities of the extensions upon the cleansing element 7. The extremity of one of the extensions is bent up into the shape of a horn 14.

It is intended that the implement shall make it possible to manipulate the cleansing element in an absolutely clean manner. It may be of interest to here note that this desirable advantage will be promoted by supplying each cleansing element 7 in an appropriate and sterile container 15 (Figure 14). This container will have a sealed cover 16. The container may obviously be made of any suitable protecting material and may be in the shape of a shell, tube, envelope, etc. Upon removal of the end (cover or the like) of the container the extensions 2 of the handle are merely inserted into the cleansing element in order to take it up whereupon the cleansing element is extracted from the container without contamination in readiness for use.

The variety of the cross sectional shapes of the handle shanks may be utilized in practice. One shape may have advantage over another. Figures 9 to 13 inclusive illustrate the foremost ones of a number of such shapes that may be used and inasmuch as the views referred to speak for themselves it is deemed unnecessary to engage in further description thereof.

Figure 8 illustrates a modification of the cleansing element 7 wherein the outstanding protrusions 9 extend only part way around. This form of cleansing element may be better adaptable for both cleansing purposes for that form in which the protrusions appear on all sides. Again referring to the structure of the handle and its resilient qualities it may be stated that the substance of such handle may be metal, celluloid, rubber, or any other material of rigid, semi-rigid or resilient nature.

The operation of the implement is readily understood. The handle 1 is intended to have some resiliency so that when the extensions are left free they will naturally spread apart to some extent. If it is deemed inexpedient to entertain this resilient quality backwardly from the point of constriction 5 it may be particularly confined to the forward extensions 2 which are made tapering for that purpose. However, in all probability, the resilient quality will extend throughout the entire handle so that a squeeze upon the shanks will bring the extensions close together and a reslease of the pressure will permit them to spread apart.

Upon applying the cleansing element 7 as described in connection with Figure 14 the spreader 4 is moved down toward the constriction 5 in order to hold the extensions 2 in the spread condition and the cleansing element in tight engagement therewith. The principle use of the implement is that of a tooth cleaner, but the same ideas may be embodied in an implement for other cleansing purposes a number of which are mentioned at the beginning. Upon desiring to affix a fresh cleansing element a new container 15 is unstopped and the forked end of the handle inserted. The handle should be compressed prior to insertion into the element and then released. The outward extension of the shanks grips the element and holds it in firm position and under tension. The specific mode of use of the element need not be enlarged upon. In order to employ what is regarded as general terminology the cleansing element may be known as a swab while the handle may be known as a swab or cleansing element holder.

In conclusion, it may be pointed out that when the swab is used as a mouth cleaner, it may be considered desirable to market the implement with an impregnation of a suitable or desirable chemical. The use of other substances or compounds may become evident upon actually introducing the invention to the public. The swabs may be impregnated with a dentifrice, or under other circumstances, they may be marketed without such prior treatment, the ultimate user exercising his own selection.

While the construction and arrangement of the improved swab holder is that of a generally preferred form obviously modifications other than those already suggested may be made without departing from the spirit of the invention or scope of the claims.

I claim:—

1. An implement of the character described comprising a tubular cleansing element, and a holder formed to provide a pair of extensions receiving the tubular element, said holder being of resilient material causing the extensions to separate and thus sustain the element under tension, and caps fitted upon the extensions being of a material to prevent the element from slipping off.

2. An implement of the character described comprising a tubular cleansing element, and a holder formed to provide a pair of extensions receiving the tubular element, said holder being of resilient material causing the extensions to separate and thus sustain the element under tension, and caps fitted upon the extensions having interrupted surfaces to prevent the element from slipping off.

3. An implement of the character described comprising a tubular cleansing element, and a holder formed to provide a pair of extensions receiving the tubular element, said holder being of resilient material causing the extensions to separate and thus sustain the element under tension, and caps fitted upon the extensions being of a material to prevent the element from slipping off, one of the caps having a horn causing a part of the element to protrude.

4. An implement of the character described comprising a forked holder including handle shanks and a horn on one shank, and a cleansing element fitted over a part of the handle shanks and over the horn, said holder having a resilient quality causing the shanks to separate and thus sustain the element under tension.

5. An implement of the character described comprising a holder formed to define a pair of shanks which merge with tapering extensions, the tapering of said extensions beginning at a point of constriction in the space between the shanks, a cleansing element fitted upon the extensions down to a point of constriction, and means movable in the space toward the point of constriction and being engageable with the surfaces of the adjacent shanks to spread the latter and the extensions thereby to hold the element in place under tension.

6. An implement of the character described comprising a tubular cleansing element of yieldable material, a holder shaped in U formation to provide a pair of shanks having extensions insertable into the element, said holder being of resilient material tending to separate the extensions and hold the element in position under tension, and a spreader operable upon the holder between the shanks to hold said extensions in the spread condition.

7. An implement of the character described comprising a swab which includes a tubular body, a holder formed to produce a pair of shanks which terminate in extensions which are tapered to render them resilient said shanks being insertable into the tubular body up to the end of the tapering extensions, and a spreader operable upon the shanks toward the extensions tending to separate them and thus hold the tubular body in position under tension.

Signed at Carlsbad in the county of San Diego and State of California this 7th day of December, 1927.

JOSEPH T. BERTHELOTE.